Figure 1:
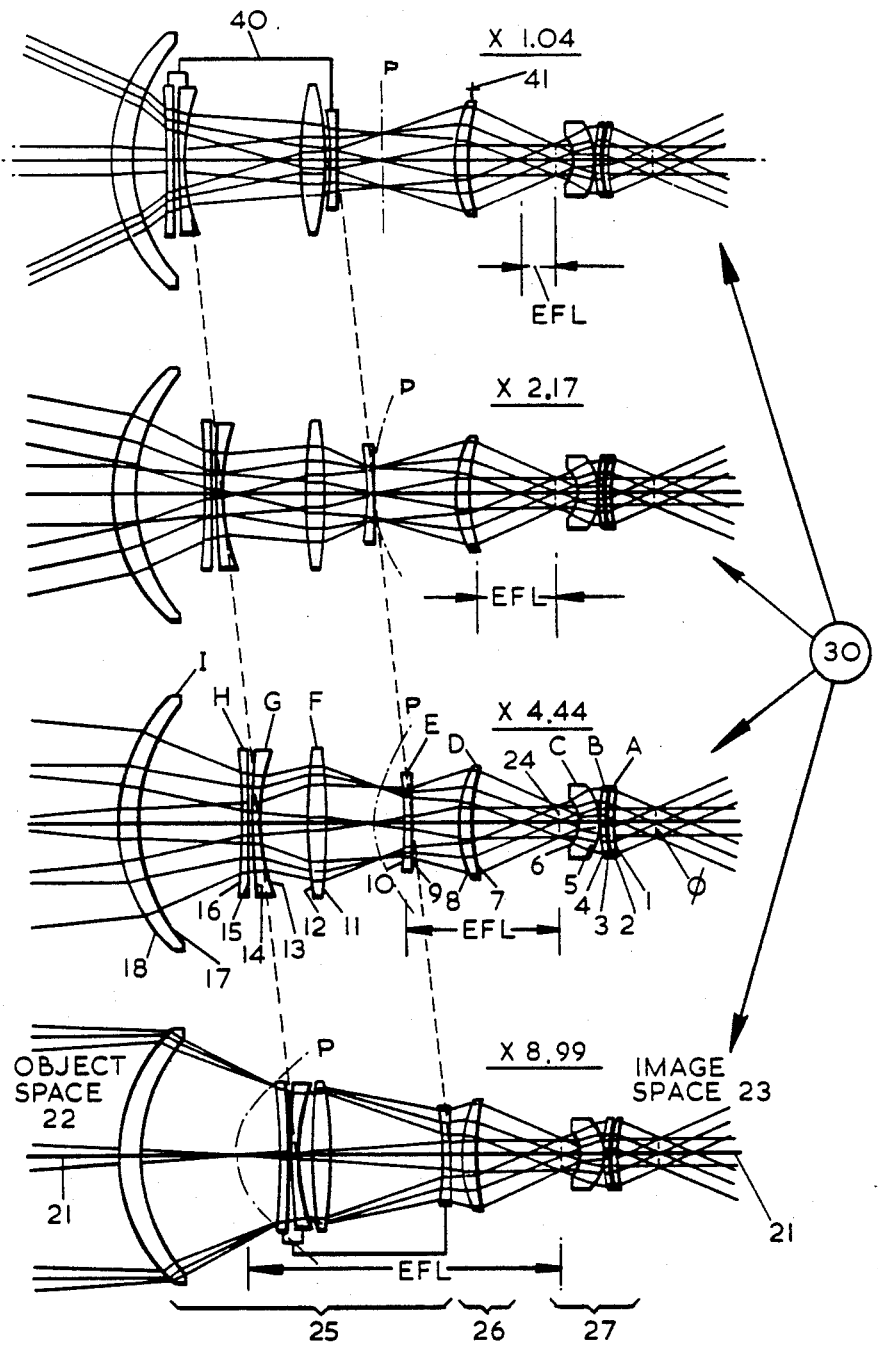

United States Patent [19]

Neil

[11] Patent Number: 4,632,498

[45] Date of Patent: Dec. 30, 1986

[54] VARIABLE MAGNIFICATION INFRARED OBJECTIVE LENS ASSEMBLY

[75] Inventor: Iain A. Neil, Strathblane, Scotland

[73] Assignee: Barr & Stroud Limited, Glasgow, Scotland

[21] Appl. No.: 783,312

[22] Filed: Sep. 13, 1985

Related U.S. Application Data

[63] Continuation of Ser. No. 548.144, Nov. 1, 1983, abandoned.

[30] Foreign Application Priority Data

Nov. 23, 1982 [GB] United Kingdom ............... 8233434

[51] Int. Cl.$^4$ .................... G02B 13/14; G02B 15/15
[52] U.S. Cl. ........................ 350/1.2; 350/427
[58] Field of Search ............ 350/1.2, 1.3, 1.4, 537, 350/560, 570, 423, 427, 428, 451, 456, 469, 471

[56] References Cited

U.S. PATENT DOCUMENTS

| | | | |
|---|---|---|---|
| 2,908,199 | 10/1959 | Kaprelian | 350/423 |
| 3,947,084 | 3/1976 | Noyes | 350/1.3 |
| 4,148,548 | 4/1979 | Thompson | 350/1.3 |
| 4,196,968 | 4/1980 | Itoh | 350/423 |
| 4,469,396 | 9/1984 | Neil | 350/1.3 |

Primary Examiner—John K. Corbin
Assistant Examiner—David J. Edmondson
Attorney, Agent, or Firm—Mason, Fenwick & Lawrence

[57] ABSTRACT

An infrared objective lens assembly comprises a four-component zoom system (25) which accepts from object space (22) radiation in the infrared waveband, and a one-component collecting system (26) which forms a real image (24) of that radiation. The components of the zoom (25) and collecting (26) systems are formed by lens elements (D,E,F,G,H,I) such that with respect to the collecting system (26) the first (E) and third (H,G) components of the zoom system (25) are mounted on a common carriage (41) and are selectively positionable along the optical axis (21) whereas the second (F) and fourth (I) components of the zoom system (25) are fixedly positioned on the optical axis (21) whereby the zoom system (25) is optically-compensated and of variable effective focal length. The fourth (I) zoom system component is formed by a lens element having an aspheric refractive surface (17) but the refractive surfaces (9-16) of all other lens elements (E,F,GH) of the zoom system (25) are non-aspheric.

8 Claims, 2 Drawing Figures

VARIABLE MAGNIFICATION INFRARED OBJECTIVE LENS ASSEMBLY

This application is a continuation of application Ser. No. 548,144, filed Nov. 1, 1983, now abandoned.

This invention relates to an infrared objective lens assembly.

The arrival of high performance infrared radiation detecting systems has led to a demand for high performance lens assemblies which for some applications require several alternative fields of view with continuity of imaging during a field of view change. Further requirements are compactness, mechanical and optical simplicity, continuity of boresighting accuracy and image resolution throughout the range of fields of view and a relatively large zoom ratio.

It is therefore an object of the present invention to provide an improved form of infrared objective lens assembly which is of high performance, is of variable field of view and which is compact.

According to the present invention there is provided an infrared objective lens assembly comprising a four-component zoom system arranged to accept from object space radiation in the infrared waveband and a one-component collecting system arranged to form a real image from radiation delivered thereto by said zoom system, the components of said zoom and collecting systems being formed by lens elements the refractive surfaces of which intercept a common optical axis, and wherein with respect to said collecting system the first and third components of said zoom system are mounted on a common carriage and are selectively positionable along said optical axis, the second and fourth components of said zoom system are fixedly positioned on said optical axis whereby said zoom system is optically-compensated and of variable effective focal length, and said fourth zoom-system component comprises a lens element having an aspheric refractive surface, the refractive surfaces of all other lens elements of the zoom system being non-aspheric.

Preferably said first and third zoom-system components each have negative optical power and said second and fourth zoom-system components each have positive optical power.

Conveniently each component of said zoom and collecting systems is formed by a single lens element.

Preferably said one-component collecting system is mounted on a carrier and is movable along said optical axis at least to a limited extent to enable refocussing of the image in compensation of the limited defocussing which occurs throughout the range of movements of the zoom system and due to the effects of temperature variations.

The assembly of the present invention is optically and mechanically simple and at the same time is rendered compact by the aspheric refractive surface of the fourth zoom-system component. Furthermore accurate boresighting alignment is easily maintained throughout the zoom movement because the first and third zoom-system components are mounted on a common carriage. The assembly may also be easily colour-corrected by selection of materials. For example all lens elements may be made of germanium except for a lens element in the third zoom-system component which may be ZnSe. The colour-correcting lens element (or elements) may be made from any of the materials listed in Table V.

Figure 2:
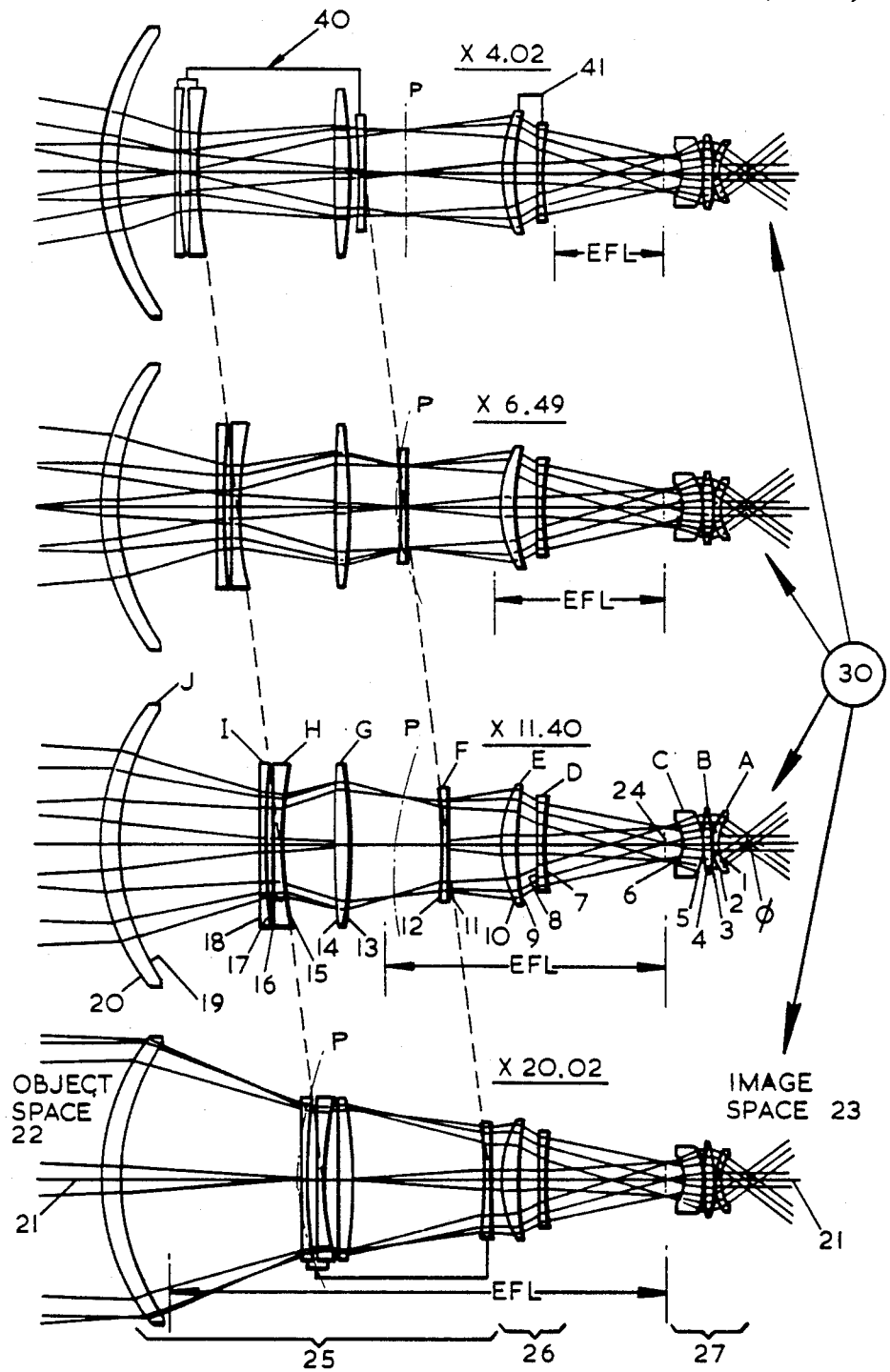

Embodiments of the present invention will now be described by way of example with reference to the accompanying drawings and tables, in which:

FIG. 1 illustrates a telescope incorporating a first lens assembly according to the present invention; and FIG. 2 illustrates a telescope incorporating a second lens assembly according to the present invention.

The telescope 30 shown in FIG. 1 is of variable magnification within the range X1 to X9, the particular magnification factor depending upon the axial location of the movable components thereof and four magnification factors are depicted separately in FIG. 1.

The telescope 30 comprises an objective lens assembly formed by a zoom system 25 and a collecting system 26 which receive infrared radiation from object space 22 and form a real image 24. An eyepiece system 27 relays the radiation from the image 24 to image space 23 via a pupil $\phi$ and the systems 25, 26 and 27 are aligned on a common optical axis 21.

Collecting system 26 is formed by a single component which in this embodiment is a single lens element D having refractive surfaces 7,8. The zoom system 25 is formed by four components of which the first (with respect to the collecting system) is formed by a single lens element E, the second is formed by a single lens element F, the third is formed by a pair of lens elements H, G and the fourth is formed by a single lens element I. Lens elements E, F, G, H and I have respective refractive surface pairs 9, 10; 11,12; 13,14; 15,16; 17,18.

Eyepiece system 27 is formed by three lens elements A,B,C with respective refractive surface pairs 1,2; 3,4; 5,6 and is fixedly located on the optical axis 21.

In order to provide the variable magnification for the telescope 30 the first and third components of the zoom system 25 are mounted on a common carriage 40 for axial movement along the optical axis 21 within the physical limits imposed by the presence of the second and fourth components of system 25 which are fixedly located on the optical axis 21 together with the presence of the collecting system 26. In order to provide focus compensation for thermal effects and for defocussing caused by the zoom movement the collecting system 26 is mounted on a carrier 41 for limited axial movement along axis 21.

Zoom system 25 is provided with refractive surfaces 9-18 of which only surface 17 is aspheric, the others being either spherical or planar. This makes system 25 relatively easy to manufacture and the presence of aspheric surface 17 makes system 25 relatively compact. The aspheric surface 17 has its profile governed by the known aspheric equation:

$$Z \cdot C = 1 - \sqrt{1 - C(C \cdot H^2 + B \cdot H^4 + G \cdot H^6 + D \cdot H^8)} \quad (1)$$

where

Z = distance, parallel to the optical axis, between the aspheric surface and a line perpendicular to the optical axis which contains the origin point where the datum surface and the aspheric surface meet C = inverse of the radius of curvature of the datum spherical surface (which is a theoretical surface constituting the spherical surface which would exist absent the aspheric)

H = distance, perpendicular to the optical axis, from the optical axis to a point on the aspheric surface and in the case of surface 17

$$C = -101.83^{-1}$$

$$B = -1.2530 \times 10^{-8}$$

$$G = -5.5100 \times 10^{-13}$$

$$D = +7.5400 \times 10^{-17}$$

and H has a maximum value of 66.915.

The remaining parameter values of the telescope 30 of FIG. 1 are given in Table I from which it will be noted that surface 7 is also aspheric being governed by equation 1 according to the values $$C = -125.65^{-1}$$

$$B = -7.8233 \times 10^{-7}$$

$$G = +5.4650 \times 10^{-11}$$

$$D = \text{zero}$$

and H has a maximum value of 29.335.

The performance values for the telescope 30 having the Table I parameters are set forth in Table II for each of the four magnification factors depicted in FIG. 1 from which it can be seen that the telescope is of high performance (i.e. near diffraction limited) over at least 75% of the field of view and is extremely compact. The effective focal length (EFL) is denoted in FIG. 1 for each magnification factor from which it will be seen that the change in effective focal length is inversely proportional to the change in position of carriage 40 and directly proportional to the change in magnification factor. As regards the optical powers of the lens elements of the zoom system 25 and the collecting system 26, elements I, F and D are each positively powered E is negatively powered H and G as a component is negatively powered and each of H and G is negatively powered. Because of the materials used to form the lens elements as set forth in Table I the telescope 30 accepts radiation in the 3-13 micron waveband and by virtue of the numeric values has a focus in the range 50 m to infinity without degradation of resolution but if such degradation is acceptable focus down to 20 m can be achieved. The telescope 30 is also athermalised over the range $-10°$ C. to $+50°$ C. without resolution degradation but displays transmission loss over the extended range $-40°$ C. to $+70°$ C. due to absorption of radiation by the germanium. The aperture diameter of the largest lens element of the zoom system is enlarged by only 4% to accommodate pupil aberrations. the "pupil" formed by the assembly, as is well known to those skilled in the art, is located internally in the assembly and occurs at the location prior to the image where the rays form cone apices. This pupil for each of the positions of the optical components shown in FIG. 1 being indicated by the letter P and shown in dot dash lines.

The telescope 30 illustrated in FIG. 2 is generally similar to that of FIG. 1 but is optimised for a different range of magnification factors (X4 to X20) and is provided with a two-element collecting system 26 in which each refractive surface is spherical. In the FIG. 2 telescope lens elements D and E form the collecting system 26 having refractive surfaces 7-10 and the zoom system 25 is formed by four-components of which the first (with respect to the system 26) is a singlet lens element F having refractive surfaces 11, 12, the second component is a singlet lens element G having refractive surfaces 13, 14 the third component is a doublet formed by lens elements H,I having refractive surfaces 15-18 and the fourth component is a singlet lens element having a single lens element J with refractive surfaces 19,20. Accordingly in the FIG. 2 arrangement only surface 19 is aspheric being governed by the values for equation 1 of $$C = -208.40^{-1}$$

$$B = -6.7000 \times 10^{-10}$$

$$G = -3.0000 \times 10^{-15}$$

$$D = +1.7000 \times 10^{-18}$$

The parameter and material characteristics of the FIG. 2 telescope are set forth in Table III and the resolution particulars in Table IV.

In both embodiments as set forth in Tables I to IV the zoom systems 25 may be scaled and optimised to provide a wide range of upper and lower effective focal lengths and magnification factors and if the largest magnification factor is sufficiently low colour-correction may not be required in which case all lens components may be made of the same material such as germanium. Furthermore where a lens element has a single aspheric refractive surface as previously set forth the aspheric surface, instead of being surface 17, may be the other refractive surface 18 of the pair of surfaces 17, 18, or alternatively both refractive surfaces 17, 18 of the element may be aspheric such that the overall effect remains the same.

It will be appreciated that the telescope 30 of the two embodiments are optimised for focus on an object at infinity and that change in the field of view (magnification) by movement of the carriage 40 does not alter the nominal focus. However for an object at a distance other than infinity the telescope 30 requires to be focussed initially and this is conveniently achieved by movement of carrier 41. In each case after the initial focussing according to the distance of the object carrier 41 may be moved to the aforesaid limited extent for refocussing of the image in compensation of temperature variations and zoom system movements.

All data recited herein and in the tables is for a temperature of 20° C. and as regards Table IV the V-values given are calculated from the standard formula $$V = \frac{\text{refractive index at 10 microns} - 1.00}{\text{refractive index at 8.5 microns} - \text{refractive index at 11.5 microns}}$$

and the term 'microns' as used herein is intended to mean micrometers ($\mu$m).

TABLE I

| Lens | Surface | Separation at Magnification | Radius of Curvature | Material | Maximum Aperture Diameter |
|---|---|---|---|---|---|
| Entrance Pupil* | $\phi$ | 0 | any | Flat | Air | 15.30 |
| A | 1 | 24.90 | any | −229.25 | Air | 37.34 |
|   | 2 | 3.25 | any | −99.58 | Ge | 38.05 |

TABLE I-continued

| Lens | Surface | Separation at | Magnification | Radius of Curvature | Material | Maximum Aperture Diameter |
|------|---------|---------------|---------------|---------------------|----------|---------------------------|
| B    | 3       | 0.50          | any           | −318.43             | Air      | 38.28                     |
|      | 4       | 3.00          | any           | −134.54             | Ge       | 38.55                     |
| C    | 5       | 0.50          | any           | 31.36               | Air      | 35.68                     |
|      | 6       | 12.96         | any           | 22.92               | Ge       | 23.84                     |
| D    | 7'#     | 60.92         | any           | −125.65             | Air      | 58.67                     |
|      | 8       | 8.00          | any           | −64.82              | Ge       | 61.27                     |
| E    | 9       | 66.00         | X1.04         | −13869.63           | Air      | 52.27                     |
|      |         | 46.00         | X2.17         |                     |          |                           |
|      |         | 26.00         | X4.44         |                     |          |                           |
|      |         | 6.00          | X8.99         |                     |          |                           |
|      | 10      | 3.25          | any           | 154.89              | Ge       | 51.44                     |
| F    | 11      | 5.59          | X1.04         | 372.97              | Air      | 78.19                     |
|      |         | 25.59         | X2.17         |                     |          |                           |
|      |         | 45.59         | X4.44         |                     |          |                           |
|      |         | 65.59         | X8.99         |                     |          |                           |
|      | 12      | 9.75          | any           | −310.81             | Ge       | 77.88                     |
| G    | 13      | 68.30         | X1.04         | −116.62             | Air      | 71.75                     |
|      |         | 48.30         | X2.17         |                     |          |                           |
|      |         | 28.30         | X4.44         |                     |          |                           |
|      |         | 8.30          | X8.99         |                     |          |                           |
|      | 14      | 4.00          | any           | −549.06             | Ge       | 73.84                     |
| H    | 15      | 2.00          | any           | 3054.37             | Air      | 75.96                     |
|      | 16      | 4.25          | any           | 660.41              | ZnSe     | 77.42                     |
| I    | 17'#    | 20.41         | X1.04         | −101.83             | Air      | 133.83                    |
|      |         | 40.41         | X2.17         |                     |          |                           |
|      |         | 60.41         | X4.44         |                     |          |                           |
|      |         | 80.41         | X8.99         |                     |          |                           |
|      | 18      | 12.5          | any           | −95.15              | Ge       | 142.63                    |

*Maximum field angle at entrance pupil = 46.4°.
Surfaces 7' and 17' have aspheric profiles.

TABLE II

Approximate R.M.S. Spot Sizes in Object Space* (milliradians)

| Magnification | Monochromatic at 10.0 micrometers | | | Polychromatic over ⊗ 8.5–11.5 micrometers | | |
|---|---|---|---|---|---|---|
| | \multicolumn{6}{c}{Field position as a fraction of the full field at entrance pupil#} |
| | 0 | 0.41 | 0.82 | 0 | 0.41 | 0.82 |
| X1.04 | 0.827 | 1.008 | 1.006 | 0.991 | 1.191 | 1.433 |
| X2.17 | 0.137 | 0.321 | 0.590 | 0.292 | 0.427 | 0.684 |
| X4.44 | 0.173 | 0.245 | 0.538 | 0.201 | 0.268 | 0.552 |
| X8.99 | 0.022 | 0.164 | 0.318 | 0.076 | 0.181 | 0.327 |

*Entrance pupil diameter = 14.4 mm.
⊗ Given as an equally weighted three wavelength accumulated measurement, the wavelengths being 8.5, 10.0 and 11.5 micrometers.
Maximum field angle at entrance pupil = 46.4°.

TABLE III

| Lens | Surface | Separation at | Magnification | Radius of Curvature | Material | Maximum Aperture Diameter |
|------|---------|---------------|---------------|---------------------|----------|---------------------------|
| Entrance Pupil* | φ | 0 | any | Flat | Air | 11.00 |
| A    | 1       | 22.20         | any           | −34.23              | Air      | 37.66                     |
|      | 2       | 6.01          | any           | −34.06              | Ge       | 43.04                     |
| B    | 3       | 0.50          | any           | 257.31              | Air      | 49.13                     |
|      | 4       | 5.71          | any           | −418.32             | Ge       | 49.16                     |
| C    | 5       | 0.50          | any           | 52.21               | Air      | 46.96                     |
|      | 6       | 17.50         | any           | 41.83               | Ge       | 34.11                     |
| D    | 7       | 111.87        | any           | −232.76             | Air      | 68.13                     |
|      | 8       | 4.25          | any           | −1147.58            | Ge       | 70.30                     |
| E    | 9       | 17.50         | any           | −232.96             | Air      | 90.30                     |
|      | 10      | 10.00         | any           | −111.48             | Ge       | 92.92                     |
| F    | 11      | 110.00        | X4.02         | −1902.59            | Air      | 88.07                     |
|      |         | 77.00         | X6.49         |                     |          |                           |
|      |         | 44.00         | X11.40        |                     |          |                           |
|      |         | 11.00         | X20.02        |                     |          |                           |
|      | 12      | 4.5           | any           | 604.52              | Ge       | 87.92                     |
| G    | 13      | 7.00          | X4.02         | 468.01              | Air      | 129.96                    |
|      |         | 40.00         | X6.49         |                     |          |                           |
|      |         | 73.00         | X11.40        |                     |          |                           |
|      |         | 106.00        | X20.02        |                     |          |                           |
|      | 14      | 12.5          | any           | −968.90             | Ge       | 129.29                    |
| H    | 15      | 109.00        | X4.02         | −279.82             | Air      | 124.28                    |
|      |         | 76.00         | X6.49         |                     |          |                           |
|      |         | 43.00         | X11.40        |                     |          |                           |
|      |         | 10.00         | X20.02        |                     |          |                           |
|      | 16      | 5.50          | any           | 3632.40             | Ge       | 126.04                    |
| I    | 17      | 6.00          | any           | −989.90             | Air      | 128.33                    |
|      | 18      | 5.50          | any           | −2315.89            | ZnSe     | 130.66                    |
| J    | 19'#    | 44.12         | X4.02         | −208.40             | Air      | 221.10                    |
|      |         | 77.12         | X6.49         |                     |          |                           |

TABLE III-continued

| Lens | Surface | Separation at Magnification | | Radius of Curvature | Material | Maximum Aperture Diameter |
|---|---|---|---|---|---|---|
| | | 110.12 | X11.40 | | | |
| | | 143.12 | X20.02 | | | |
| | 20 | 15.50 | any | −183.19 | Ge | 229.09 |

*Maximum field angle at entrance pupil = 72°.
Surface 19' has an aspheric profile

TABLE IV

Approximate R.M.S. Spot Sizes in Object Space* (milliradians)

| Magnification | Monochromatic at 10.0 micrometers | | | Polychromatic over ⊗ 8.5–11.5 micrometers | | |
|---|---|---|---|---|---|---|
| | Field position as a fraction of the full field at entrance pupil# | | | | | |
| | 0 | 0.42 | 0.83 | 0 | 0.42 | 0.83 |
| X4.02 | 0.484 | 0.789 | 0.884 | 0.547 | 0.832 | 0.923 |
| X8.93 | 0.629 | 0.601 | 0.483 | 0.638 | 0.610 | 0.493 |
| X14.03 | 0.087 | 0.159 | 0.297 | 0.095 | 0.164 | 0.300 |
| X20.02 | 0.041 | 0.465 | 0.100 | 0.059 | 0.065 | 0.110 |

*Entrance pupil diameter = 10 mm.
⊗ Given as an equally weighted three wavelength accumulated measurement, the wavelengths being 8.5, 10.0 and 11.5 micrometers.
Maximum field angle at entrance pupil = 72°.

TABLE V

| Material | Refractive Index* | V-value# |
|---|---|---|
| BS2 | 2.85632 | 248 |
| BSA | 2.77917 | 209 |
| TI 1173 | 2.60010 | 142 |
| AMTIR 1 | 2.49745 | 169 |
| BS1 | 2.49158 | 152 |
| TI20 | 2.49126 | 144 |
| ZnSe | 2.40653 | 77 |
| KRS 5 | 2.37044 | 260 |
| CsI | 1.73933 | 316 |
| CsBr | 1.66251 | 176 |
| KI | 1.62023 | 137 |

*Refractive index is for a wavelength of 10 micrometers.
Over the wavelength range 8.5–11.5 micrometers.

What is claimed is:

1. An infrared objective lens assembly comprising a four-component zoom system arranged to accept from object space input radiation in the infrared waveband and a one-component collecting system arranged to form a real image from radiation delivered thereto by said zoom system, the components of said zoom and collecting system being formed by lens elements the refractive surfaces of which intercept a common optical axis, and wherein with respect to said collecting system the first and third components of said zoom system each have negative optical power and are mounted on a common carriage so as to be selectively positionable along said optical axis, the second and fourth components of said zoom system each have positive optical power and are fixedly positioned on said optical axis whereby said zoom system is optically-compensated and of variable effective focal length, said third zoom-system component being movable between a first location proximal to said fourth zoom-system component which first location establishes the lowest magnification factor of the zoom system and a second location, proximal to said second zoom-system component, which second location establishes the highest magnification factor of the zoom system, said zoom system being unstopped so that movements of the first and third zoom-system components give rise to movements in the axial position of the pupil formed by the assembly prior to the real image, said pupil moving between a lowest-magnification-factor position lying intermediate the collecting system and the first zoom-system component and a highest-magnification-factor position lying intermediate the third zoom-system component and the fourth zoom-system component, and said fourth zoom-system component comprises a lens element having an aspheric refractive surface, the refractive surfaces of all other lens elements of the zoom system being non-aspheric.

2. An assembly as claimed in claim 1, wherein said collecting system is mounted on a carrier and is movable along said optical axis at least to a limited extent to enable refocussing of the image in compensation of the limited defocussing which occurs throughout the range of movements of the zoom system and due to the effects of temperature variations.

3. An assembly as claimed in claim 2, wherein each component of said zoom and collecting systems is formed by a single lens element.

4. An assembly as claimed in claim 1, wherein each lens element is made of germanium.

5. An afocal refractor telescope comprising an objective lens assembly as claimed in claim 1 in combination with an eyepiece system.

6. An assembly as claimed in claim 1, wherein said fourth zoom system component is made of germanium and at least one lens element of said third zoom system component is colour correcting being made of a material listed in the following table:

| Material | Refractive Index* | V-value# |
|---|---|---|
| BS2 | 2.85632 | 248 |
| BSA | 2.77917 | 209 |
| TI 1173 | 2.60010 | 142 |
| AMTIR 1 | 2.49745 | 169 |
| BS1 | 2.49158 | 152 |
| TI20 | 2.49126 | 144 |
| ZnSe | 2.40653 | 77 |
| KRS 5 | 2.37044 | 260 |
| CsI | 1.73933 | 316 |
| CsBr | 1.66251 | 176 |
| KI | 1.62023 | 137 |

*Refractive index is for a wavelength of 10 micrometers.
Over the wavelength range 8.5–11.5 micrometers.

7. An infrared objective lens assembly comprising a four-component zoom system arranged to accept from object space radiation in the infrared waveband and a one-component collecting system arranged to form a real image from radiation delivered thereto by said zoom system, the components of said zoom and collecting systems being formed by lens elements the refractive surfaces of which intercept a common optical axis, and wherein with respect to said collecting system the first and third components of said zoom system each have negative optical power and are mounted on a common carriage so as to be selectively positionable along said optical axis, the second and fourth components of said zoom system each have positive optical power and are fixedly positioned on said optical axis whereby said zoom system is optically-compensated and of variable effective focal length, wherein each of the first, second and fourth components of said zoom-system is formed by a single lens element and said third zoom-system component is formed by a lens doublet, and the lens elements of the zoom-system have refractive surface curvatures, separation distances between refractive surfaces (RS) as measured successively from the refractive surface proximal to the collecting system, materials, and maximum aperture diameters, as set forth in the following table:

| Item | Surface | Separation Distance (mm) | Magnification Factor | Radius of Curvature (mm) | Material | Maximum Aperture Diameter |
|---|---|---|---|---|---|---|
| First Component | 1st RS | 66.00 | X1.04 | −13869.63 | Air | 52.27 |
| | | 46.00 | X2.17 | | | |
| | | 26.00 | X4.44 | | | |
| | | 6.00 | X8.99 | | | |
| | 2nd RS | 3.25 | any | 154.89 | Ge | 51.44 |
| Second Component | 1st RS | 5.59 | X1.04 | 372.97 | Air | 78.19 |
| | | 25.59 | X2.17 | | | |
| | | 45.59 | X4.44 | | | |
| | | 65.59 | X8.99 | | | |
| | 2nd RS | 9.75 | any | −310.81 | Ge | 77.88 |
| Third Component | | | | | | |
| 1st lens element | 1st RS | 68.30 | X1.04 | −116.62 | Air | 71.75 |
| | | 48.30 | X2.17 | | | |
| | | 28.30 | X4.44 | | | |
| | | 8.30 | X8.99 | | | |
| | 2nd RS | 4.00 | any | −549.06 | Ge | 73.84 |
| 2nd Lens element | 1st RS | 2.00 | any | 3054.37 | Air | 75.96 |
| | 2nd RS | 4.25 | any | 660.41 | ZnSe | 77.42 |
| Fourth Component | 1st RS | 20.41 | X1.04 | Aspheric Air | 133.83 | |
| | | 40.41 | X2.17 | | | |
| | | 60.41 | X4.44 | | | |
| | | 80.41 | X8.99 | | | |
| | 2nd RS | 12.5 | any | −95.15 | Ge | 142.63 | where the aspheric refractive surface has its profile governed by the equation;

$$Z \cdot C = 1 - \sqrt{1 - C(CH^2 + BH^4 + GH^6 + DH^8)}$$

Z being the distance parallel to the optical axis between the asperic surface and a line perpendicular to the optical axis which meets the optical axis where the datum spherical surface crosses the optical axis, the datum spherical surface being a theoretical surface constituting the spherical surface which would exist absent the aspheric; and C being the inverse of the radius of curvature of the datum surface and having a value of $-101.83^{-1}$, B being a constant of value $-1.2530 \times 10^{-8}$, G being a constant of value $-5.5100 \times 10^{-13}$, and D being a constant value $+7.5400 \times 10^{-17}$.

8. An infrared objective lens assembly comprising a four-component zoom system arranged to accept from object space radiation in the infrared waveband and a one-component collecting system arranged to form a real image from radiation delivered thereto by said zoom system, the components of said zoom and collecting systems being formed by lens elements the refractive surfaces of which intercept a common optical axis, and wherein with respect to said collecting system the first and third components of said zoom system each have negative optical power and are mounted on a common carriage so as to be selectively positionable along said optical axis, the second and fourth components of said zoom system each have positive optical power and are fixedly positioned on said optical axis whereby said zoom system is optically-compensated and of variable effective focal length, wherein each of the first, second and fourth components of said zoom-system is formed by a single lens element and said third zoom-system component is formed by a lens doublet, and the lens elements of the zoom-system have refractive surface curvatures, separation distances between refractive surfaces (RS) as measured successively from the refractive surface proximal to the collecting system, materials, and maximum aperture diameters, as set forth in the following table:

| Item | Surface | Separation Distance (mm) | Magnification Factor | Radius of Curvature (mm) | Material | Maximum Aperture Diameter |
|---|---|---|---|---|---|---|
| First Component | 1st RS | 110.00 | X4.02 | −1902.59 | Air | 88.07 |
| | | 77.00 | X6.49 | | | |
| | | 44.00 | X11.40 | | | |
| | | 11.00 | X20.02 | | | |
| | 2nd RS | 4.5 | any | 604.52 | Ge | 87.92 |
| Second Component | 1st RS | 7.00 | X4.02 | 468.01 | Air | 129.96 |
| | | 40.00 | X6.49 | | | |
| | | 73.00 | X11.40 | | | |
| | | 106.00 | X20.02 | | | |
| | 2nd RS | 12.5 | any | −968.90 | Ge | 129.29 |
| Third Component | | | | | | |
| 1st lens element | 1st RS | 109.00 | X4.02 | −279.82 | Air | 124.28 |
| | | 76.00 | X6.49 | | | |

| Item | Surface | Separation Distance (mm) | Magnification Factor | Radius of Curvature (mm) | Material | Maximum Aperture Diameter |
| --- | --- | --- | --- | --- | --- | --- |
| | | 43.00 | X11.40 | | | |
| | | 10.00 | X20.02 | | | |
| | 2nd RS | 5.50 | any | 3632.40 | Ge | 126.04 |
| 2nd lens | 1st RS | 6.00 | any | −989.90 | Air | 128.33 |
| element | 2nd RS | 5.50 | any | −2315.89 | ZnSe | 130.66 |
| Fourth Component | 1st RS | 44.12 | X4.02 | Aspheric | Air | 221.10 |
| | | 77.12 | 6.49 | | | |
| | | 110.12 | X11.40 | | | |
| | | 143.12 | X20.02 | | | |
| | 2nd RS | 15.50 | any | −183.19 | Ge | 229.09 | where the aspheric refractive surface has its profile governed by the equation;

$$Z \cdot C = 1 - \sqrt{1 - C(CH^2 + BH^4 + GH^6 + DH^8)}$$

Z being the distance parallel to the optical axis between the asperic surface and a line perpendicular to the optical axis which meets the optical axis where the datum spherical surface crosses the optical axis, the datum spherical surface being a theoretical surface constituting the spherical surface which would exist absent the aspheric; and C being the inverse of the radius of curvature of the datum surface and having a value of $-208.40^{-1}$, B being a constant of value $-6.7000 \times 10^{-10}$, G being a constant of value $-3.0000 \times 10^{-15}$, and D being a constant value $+1.7000 \times 10^{-18}$.

* * * * *